United States Patent Office 3,641,118
Patented Feb. 8, 1972

3,641,118
PURIFICATION OF 2,2-DIMETHYL-1,3-PROPANE-
DIOLMONO(HYDROXYPIVALATE)
Rolf Platz, Mannheim, and Franz Merger, Ludwigshafen
(Rhine), Germany, assignors to Badische Anilin- &
Soda-Fabrik Aktiengesellschaft, Ludwigshafen (Rhine),
Germany
No Drawing. Filed Oct. 4, 1968, Ser. No. 764,994
Claims priority, application Germany, Oct. 6, 1967,
P 16 43 671.8
Int. Cl. C07c 69/66
U.S. Cl. 260—484 R                               9 Claims

ABSTRACT OF THE DISCLOSURE

Purification of 2,2-dimethyl-1,3-propanediol mono(hydroxypivalate) by means of acid ion exchangers.

---

This invention relates to the purification of 2,2-dimethyl-1,3-propanediol mono(hydroxypivalate) by means of acid ion exchangers.

2,2-dimethyl-1,3-propanediol mono(hydroxypivalate) is prepared by means of the Tishchenko reaction, for example according to U.S. patent specification No. 3,057,-911 from hydroxypivalaldehyde, and contains impurities which when it is used for any of numerous syntheses, for example for the production of light resistant, difficulty hydrolyzable and air-drying polyesters of the plastics or surface coatings industry, cause a yellow coloration which impairs the quality. Repeated distillation of the ester does not remove the said impurities.

The object of this invention is to provide a new purification process for the production of 2,2-dimethyl-1,3-propanediol mono(hydroxypivalate) in practically quantitive yields and in a purity which satisfies the said requirements.

This and other objects of the invention are achieved and pure 2,2-dimethyl-1,3-propanediol mono(hydroxypivalate) is obtained advantageously by treating the crude product with acid ion exchangers at a temperature of from 0° to 100° C.

The process according to this invention, which is surprisingly simple to carry out, yields 2,2-dimethyl-1,3-propandiol mono(hydroxypivalate) in practically quantitive yield and in a purity which satisfies the above mentioned requirements. The ion exchanger does not retain the ester but only the impurities so that any ester contained in the impurities is liberated.

Purification is carried out by means of an acid ion exchanger, preferably an acid synthetic resin exchanger. These exchangers include for example all the cation exchangers described in Table 3 on page 528 in Houben-Weyl, "Methoden der organischen Chemie," volume I/1. It is preferred to use strong acid exchangers, for example phenolsulfonic acid or polystyrenesulfonic acid resins, or exchangers containing acid resins, for example bifunctional condensation resins. As a rule the esters are passed over the ion exchanger, for example through an appropriate exchanger column, the amount of ester and exchanger used depending on the selectivity of the exchanger used at the purification temperature. Generally from 20 to 200% by weight of exchanger is used with reference to the average amount of ester passed through the exchanger per hour. The exchanger may contain up to 50% by weight of water depending on its structure.

Purification is carried out batchwise or continuously at a temperature of from 0° to 100° C., preferably from 20° to 60° C. It is advantageous to use a solvent which is inert under the prevailing conditions, such as water, alkanols, for example methanol or ethanol, or cyclic ether, for example dioxane. In continuous operation from 1 to 20%, preferably from 5 to 10%, by weight of water is as a rule added to the ester in order to prevent dehydration or shrinkage of the exchanger. When solvent is not used, naturally the purification will be carried out at a temperature above the melting point of the ester (49° to 50° C.).

Purification may be carried out as follows: the melt of 2,2-dimethyl-1,3-propanediol mono(hydroxypivalate) (or a solution thereof in water and/or if desired an organic solvent) is passed at the purification temperature through a column filled with exchanger. The end product may be separated by distillation under subatmospheric pressure from the discharge from the column. Any impurities or portions of the exchanger which are entrained by the solution flowing through during purification may be retained by a subsequent basic exchanger (for example a polyvinylbenzyl ammonium resin) and thus separated.

The abovementioned publications may be referred to as regards use.

The invention is illustrated by the following examples. Parts given in the following examples are by weight.

EXAMPLE 1

A solution consisting of 500 parts of 2,2-dimethyl-1,3-propanediol mono(hydroxypivalate), 500 parts of water and 50 parts of methanol is passed at room temperature in the course of ninety minutes through a column filled with 600 parts of polystyrene-sulfonic acid (crosslinked with divinylbenzene). The purified ester is recovered quantitatively from the effluent solution by vacuum distillation at a boiling point of 152° C. at 10 mm.

The end product is heated for 6 hours with the stoichiometric amount of maleic anhydride at 190° C. A polyester having an iodine color number of less than 1 is obtained, whereas the polyester from an unpurified ester has an iodine color number of 2 to 3. Determination of the iodine color number is carried out in accordance with DIN 6162.

EXAMPLE 2

A mixture of 100 parts of water and 1000 parts of 2,2-dimethyl-1,3-propanediol mono(hydroxypivalate) is passed per hour through a column filled with 600 parts of polystyrenesulfonic acid (crosslinked with divinylbenzene and with 600 parts of polyvinylbenzyl ammonium resin which is kept at 50° C. The effluent solution contains the 2,2-dimethyl - 1,3 - propanediol mono(hydroxypivalate) used practically quantitatively. It may be directly used further and when heated with the stoichiometric amount of maleic anhydride at 190° C. for six hours, with the water being distilled off, it yields an unsaturated polyester having an iodine color number of less than 1 and an APHA color number of from 0 to 10. The APHA color number is determined according to American Standard Method 1209.

We claim:
1. A process for removing impurities from 2,2-dimethyl-1,3-propanediol mono(hydroxypivalate), prepared by means of the Tishchenko reaction which cause yellow discoloration when said hydroxypivalate is used for the production of light-resistant, difficultly hydrolyzable and air-drying polyesters, which impurities cannot be removed by distillation, said process comprising treating said 2,2-dimethyl-1,3-propanediol mono(hydroxypivalate) at a temperature of from 0° to 100° C. with an acid synthetic resin ion exchanger in an amount from 20 to 200% by weight with reference to the average hourly amount of ester passed through said ion exchanger.

2. A process as claimed in claim 1 wherein the treatment is carried out with a strongly acid synthetic resin exchanger.

3. A process as claimed in claim 1 wherein the treatment is carried out with a phenol resin.

4. A process as claimed in claim 1 wherein the treatment is carried out with a polystyrenesulfonic acid resin.

5. A process as claimed in claim 1 wherein the treatment is carried out with a bifunctional condensation resin.

6. A process as claimed in claim 1 wherein the treatment is carried out at a temperature of from 20° to 60° C.

7. A process as claimed in claim 1 wherein the treatment is carried out in the presence of an inert solvent.

8. A process as claimed in claim 1 wherein the treatment is carried out in the presence of 1 to 20% by weight of water with reference to the ester.

9. A process as claimed in claim 1 wherein the treatment is carried out in the presence of 5 to 10% by weight of water with reference to the ester.

References Cited

Calmon and Kressman: Ion Exchangers in Organic Biochemistry, Interscience (1957), pp. 640–643.

LORRAINE A. WEINBERGER, Primary Examiner

P. J. KILLOS, Assistant Examiner